(12) United States Patent
Larsson

(10) Patent No.: US 10,170,809 B2
(45) Date of Patent: Jan. 1, 2019

(54) ENERGY STORAGE ENCLOSURE

(71) Applicant: VOLVO CAR CORPORATION, Gothenburg (SE)

(72) Inventor: Johannes Larsson, Gothenburg (SE)

(73) Assignee: VOLVO CAR CORPORATION (SE)

( * ) Notice: Subject to any disclaimer, the term of this patent is extended or adjusted under 35 U.S.C. 154(b) by 650 days.

(21) Appl. No.: 14/632,110

(22) Filed: Feb. 26, 2015

(65) Prior Publication Data
US 2015/0255837 A1 Sep. 10, 2015

(30) Foreign Application Priority Data

Mar. 5, 2014 (EP) .................................. 14157915

(51) Int. Cl.
*H01M 10/65* (2014.01)
*H01M 10/6556* (2014.01)
(Continued)

(52) U.S. Cl.
CPC ..... *H01M 10/6556* (2015.04); *H01M 2/0245* (2013.01); *H01M 2/0262* (2013.01); *H01M 2/1077* (2013.01); *H01M 2/1083* (2013.01); *H01M 10/0468* (2013.01); *H01M 10/0481* (2013.01); *H01M 10/625* (2015.04); *H01M 10/6554* (2015.04); *H01M 10/6555* (2015.04);
(Continued)

(58) Field of Classification Search
CPC .. H01M 10/65; H01M 10/655; H01M 10/653; H01M 10/6556; H01M 6/5038
See application file for complete search history.

(56) References Cited

U.S. PATENT DOCUMENTS

2006/0204840 A1\* 9/2006 Jeon .................... H01M 2/1077
429/152
2011/0212355 A1 9/2011 Essinger et al.
(Continued)

FOREIGN PATENT DOCUMENTS

CN 102170034 A 8/2011
CN 103140957 A 6/2013
(Continued)

OTHER PUBLICATIONS

Extended European Search Report Dated Oct. 1, 2014, Application No. 14157915.1-1359, Applicant Volvo Car Corporation, 5 Pages.
(Continued)

*Primary Examiner* — Jeremiah R Smith
(74) *Attorney, Agent, or Firm* — Brooks Kushman P.C.

(57) ABSTRACT

An energy storage enclosure arrangement is provided for accommodating a storage unit comprising an energy storage cell stacked with a cooling plate in a longitudinal direction, the cooling plate being in thermal contact with the energy storage cell. The arrangement includes an energy storage enclosure comprising three wall members forming an U-shape and having an extension in a longitudinal direction, and means for compressing the enclosure arranged to apply a force on the enclosure and the storage unit in the longitudinal direction. The enclosure is resilient in the longitudinal direction, such that when a force is applied in the longitudinal direction the enclosure is compressed, and a contact pressure between the cooling plate and the energy storage cell is limited by the resilient enclosure.

19 Claims, 3 Drawing Sheets

(51) Int. Cl.
  *H01M 2/02* (2006.01)
  *H01M 10/04* (2006.01)
  *H01M 10/625* (2014.01)
  *H01M 10/6555* (2014.01)
  *H01M 10/6554* (2014.01)
  *H01M 2/10* (2006.01)
  *H01M 10/653* (2014.01)
  *H01M 6/50* (2006.01)

(52) U.S. Cl.
  CPC .......... *H01M 6/5038* (2013.01); *H01M 10/65* (2015.04); *H01M 10/653* (2015.04)

(56) References Cited

U.S. PATENT DOCUMENTS

| | | |
|---|---|---|
| 2012/0183823 A1 | 7/2012 | Von Borck et al. |
| 2013/0164578 A1* | 6/2013 | Sweet ............... H01M 10/0413 429/82 |
| 2013/0164592 A1* | 6/2013 | Maguire ............. H01M 2/1077 429/120 |
| 2013/0266838 A1 | 10/2013 | Von Borck et al. |
| 2013/0288098 A1 | 10/2013 | Hamlett |
| 2013/0288100 A1 | 10/2013 | Dunkel et al. |
| 2014/0079968 A1* | 3/2014 | Schmidt ............. B60L 11/1879 429/83 |

FOREIGN PATENT DOCUMENTS

| | | |
|---|---|---|
| DE | 102010047453 A1 | 4/2012 |
| GB | 1386025 A | 3/1975 |

OTHER PUBLICATIONS

Chinese Office Action dated Aug. 28, 2018, Application No. 201510086955.8, Applicant Volvo Car Corporation, 9 Pages.

* cited by examiner

ENERGY STORAGE ENCLOSURE

CROSS-REFERENCE TO RELATED APPLICATIONS

This application claims foreign priority benefits under 35 U.S.C. § 119(a)-(d) to European patent application number EP 14157915.1, filed Mar. 5, 2014, which is incorporated by reference in its entirety.

TECHNICAL FIELD

The present disclosure relates to an energy storage enclosure for accommodating an energy storage unit. Furthermore, the present disclosure relates to an energy storage module and a battery pack comprising the energy storage enclosure.

BACKGROUND

Electric and hybrid vehicles have recently become a more common sight on roads worldwide. They have one thing in common and that is they all require a large and powerful rechargeable energy storage, also known as a battery. In most such batteries, several battery cells are stacked together to form a battery powerful enough to provide energy for the vehicle to drive for example several tens of kilometers. The battery cells are in most cases mechanically fixed together with a common frame or enclosure to form a single unit which is conveniently mounted in the vehicle. Furthermore, the size of a battery providing sufficient power for driving an electric or hybrid energy is relatively large, whereby the battery cells tend to be closely packed in order to reduce the size of the battery.

However, the highly powerful batteries also produce high amounts of heat when in operation. Therefore, an appropriate cooling system is required for transporting heat away from the battery cells in order to prevent that the battery cells or other parts of the battery are damaged from overheating. The heat may for example be transported away from the battery cells by a liquid coolant passed through a cooling system in thermal contact with the battery cells. Alternatively or complimentary, cooling may be achieved by an air cooling system.

One example of a battery module having a cooling system is disclosed by US2013/0288098. The battery module has battery cells stacked in parallel enclosed in a housing. The stack of battery cells is arranged on a cooling plate, and compressible pads are arranged between the stack of battery cells and the cooling plate. In order to maximize the thermal contact between the battery cells, the pads, and the cooling plates, the battery module may be compressed in the vertical direction perpendicular to the stacking direction of the cells. Thereby, the compressible pads are compressed between the battery cells and the cooling plate.

However, the contact surface between the battery cells and the cooling plate is rather limited since the cooling plates are arranged vertically with respect to the stacking direction of the battery cells, as disclosed by US2013/0288098, thereby also the thermal contact is relatively weak. Furthermore, the compression pads (and compression limiting pads) make the battery module relatively complicated.

SUMMARY

In view of the above, it is a general object of the present disclosure to provide an energy storage enclosure which provides an improved cooling performance for an energy storage device.

According to a first aspect it is therefore provided an energy storage enclosure for accommodating a storage unit comprising an energy storage cell arranged adjacent to and stacked with a cooling plate in a longitudinal direction, the cooling plate being in thermal contact with the energy storage cell, wherein the energy storage enclosure comprises: three wall members configured to be in contact with the storage unit, the wall members forming a U-shape and each wall member having an extension in the longitudinal direction, means for compressing the energy storage enclosure arranged to apply a force on the energy storage enclosure and the storage unit in the longitudinal direction, wherein the energy storage enclosure is resilient in the longitudinal direction, such that when a force is applied in the longitudinal direction on the energy storage enclosure and the storage unit, the energy storage enclosure is compressed, and a contact pressure between the cooling plate and the energy storage cell is limited by the resilient energy storage enclosure.

The present disclosure is based on the realization that an improved thermal contact between the battery cells and the cooling plates enables a more efficient heat transfer from the battery cells. Furthermore, it is realized that the thermal contact may be improved by applying a force compressing a stack of battery cells and cooling plates. In order to obtain such compression in a reproducible manner, the enclosure is made in a resilient material such that the enclosure may be compressed when exposed to a force and later de-compressed when the force is relieved. Hence, the resilient energy storage enclosure allows the energy storage enclosure to be compressed in the longitudinal direction when exposed to a force in the longitudinal direction, and as a result a contact pressure between the cooling plate and the energy storage cell is increased. Additionally, when exposed to the force in the longitudinal direction, the resilient energy storage enclosure limits the compression of the energy storage enclosure by attempting to spring back into the original shape of the energy storage enclosure. Thereby, the resilient energy storage enclosure prevents excessive force on the storage unit which may damage the battery cells. Moreover, the energy storage enclosure is deformable in a non-destructive manner. Thereby, it was realized that the contact pressure between the cooling plates and the energy storage cells may be controlled by controlling the compressing force.

An energy storage cell may be a battery cell such as for example a lithium-ion pouch cell. Moreover, a cooling plate may be provided with air cooling or liquid cooling means, via for example channels or conduits running through the material of the cooling plate. The energy storage enclosure may accommodate one or more storage units, or one or more energy storage cells. Furthermore, a cooling plate and an energy storage cell are stacked meaning that they are aligned in a longitudinal direction.

The energy storage enclosure is U-shaped meaning that the three wall members are arranged such that two of the wall members are parallel with each other and the third wall member connects the two parallel wall members. The third wall member is essentially perpendicular to the two parallel wall members. The U-shaped energy storage enclosure may further have an open side opposite the third wall member. Through the open side, opposite the third wall member, cables for electrically connecting to the energy storage cells may be fed. Alternatively, the cables may be fed through holes going through one of the wall members. The holes may be made to have a size suitable to fit the width of the cables.

The wall members are configured to be in contact with the storage unit meaning that the wall members may be in physical contact with the wall members such that the storage unit is kept in place by the wall members. Furthermore, there may be a thermal contact between the storage unit and the wall members of the energy storage enclosure. In some examples, the energy storage enclosure comprising the three wall members may be arranged to tightly surround the storage unit.

The longitudinal direction is along an axis substantially parallel with planes of the wall members. For example, the longitudinal direction is along an axis substantially parallel with at least one axis in each of the planes of the wall members.

The U-shaped energy storage enclosure may have open ends in the longitudinal direction such that in the longitudinal direction a see-through space is formed where the energy storage cells may be stacked. In this way, assembly of storage units in the energy storage enclosure is facilitated.

According to an embodiment of the disclosure, the means for compressing may comprise a compressing element arranged to extend from a first end of the storage unit to a second end of the storage unit in the longitudinal direction. A compressing element should be configured such that a compression of the energy storage enclosure and the storage unit is possible with the compressing element. The compressing element may be arranged to extend along the entire length of the storage unit in the longitudinal direction.

According to an embodiment of the disclosure, the compressing element may be a pin bolt arranged through a through-hole of the energy storage enclosure. A pin-bolt may be an elongated rod having threads at least on one side of the elongated shape. The pin-bolt extends through the stack of energy storage cells and cooling plates forming a storage unit. If several energy storage enclosures and thereby also several storage units are stacked, the pin-bolt may extend through the entire stack in the longitudinal direction. On one side of the pin-bolt along the longitudinal direction (thus along the elongated shape) there may be a stop element larger than the size of the through-hole rigidly attached to the pin-bolt such that the pin-bolt is may not fall through the through-hole in a direction opposite the stop element. On the side of the pin-bolt opposite the stop element there may be threads on the pin-bolt. A nut may screw onto the pin-bolt on the threads for securing the pin-bolt. By tightening the nut, the energy storage enclosure and the storage unit is compressed such that a contact pressure between the cooling plate and the energy storage cell is increased, although limited by the resilient energy storage enclosure.

According to an embodiment of the disclosure, the means for compressing may comprise end plates arranged on each side of the energy storage module in the longitudinal direction to apply the force on the wall members. The means for compressing may also comprise a bar, a rod, or a cross-like element arranged to apply the force.

According to an embodiment of the disclosure, the energy storage enclosure is made from a foam material. With a foam material a sufficient thermal insulation qualities and resilient properties may be obtained for the energy storage enclosure. The energy storage enclosure advantageously provides thermal isolation for the battery cell.

In one embodiment, the foam material is expanded polypropylene (EPP). However, other materials having similar resilient properties and thermal insulation qualities are possible.

According to an embodiment of the disclosure, the energy storage enclosure may further comprise flanges arranged on an outer surface of at least one of the wall members. The flanges may improve the ability for an external housing to maintain the position of the energy storage enclosure in the external housing by compressing the flanges. Moreover, the thermal contact is limited between the external housing and the energy storage enclosure by the flanges. The flanges may be ridges and valleys formed on the outside surface of the energy storage enclosure.

According to an embodiment of the disclosure, the energy storage enclosure may be formed in one piece. Thereby, manufacturing of the energy storage enclosure may be facilitated since mounting of several parts for assembling the energy storage enclosure is not necessary. Furthermore, the overall assembly of the energy storage enclosure and the storage unit may be performed fast in a convenient manner with maintained cooling performance of an energy storage cell mounted in the energy storage enclosure. The energy storage enclosure may be manufactured using e.g., casting, water cutting, or laser cutting, etc. Furthermore, the flanges may be made as part of the energy storage enclosures when formed in one piece.

According to an embodiment of the disclosure, the energy storage enclosure may further comprise a groove formed in an inner side of a wall member of the energy storage enclosure for receiving a transfer conduit for transferring a coolant to the cooling plate. For example, a groove may be formed during manufacturing of the energy storage enclosure. The groove may be shaped to house a conduit, for example a pipe conduit, such that the energy storage cell may be placed adjacent to the pipe. The groove may be arranged along the longitudinal direction such that the coolant may be transferred to more than one cooling plate arranged along the longitudinal direction. Furthermore, the conduit/pipe may not be rigidly attached to the groove but is instead allowed to slide in the groove. In this way, the energy storage enclosure may be compressed without compressing the conduit which otherwise may cause damage to the conduit.

According to a second aspect of the present disclosure, there is provided an energy storage module comprising: an energy storage enclosure according to the previous aspect and/or embodiments mentioned above; and a storage unit comprising an energy storage cell arranged adjacent to and stacked with a cooling plate in a longitudinal direction, the cooling plate being in thermal contact with the energy storage cell, wherein the storage unit is arranged in the energy storage enclosure. Thus, the energy storage enclosure may accommodate an energy storage cell and a cooling plate. Thereby, the energy storage enclosure together with the energy storage cell and the cooling plate are provided in a single unit.

According to an embodiment of the disclosure, side plates may be arranged to seal the energy storage enclosure in the longitudinal direction. The end plates are substantially rigid and preferably made from a plastic material such as e.g., Acrylonitrile butadiene styrene (ABS). The side plates may be attached to the energy storage enclosures at end portions using e.g., glue, ultrasonic welding, staples, vibration welding, etc. The side plates improve the stability of the energy storage enclosure. Furthermore, the side plates enable a modular configuration of an energy storage enclosure with the storage unit. A typical thickness of the side plate is between 1 and 4 mm.

According to an embodiment of the disclosure, the energy storage enclosure may accommodate at least two energy storage cells and at least one cooling plate stacked and in thermal contact with the energy storage cells.

Further effects and features of this second aspect of the present disclosure are largely analogous to those described above in connection with the first aspect of the disclosure.

According to a third aspect of the present disclosure, there is provided a battery pack comprising a plurality of energy storage modules.

The modular configuration of the battery pack enables a facilitated way of for example replacing an energy storage module or performing maintenance of a single module since an energy storage module is easily removed from the e.g., a battery pack with several energy storage modules. Furthermore, depending on the desired power output of the battery pack, the number of energy storage modules may be adapted thereafter.

According to an embodiment of the disclosure, the energy storage modules may be stacked in the longitudinal direction, wherein the means for compressing are arranged to apply the force on the battery pack in the longitudinal direction causing a compression of each energy storage enclosure of the battery pack.

According to an embodiment of the disclosure, the battery pack may further comprise a housing arranged to accommodate the energy storage modules of the battery pack. In other words, a housing, which may be a rigid housing, encloses the energy storage modules. Furthermore, flanges (if present) of the energy storage enclosures of the energy storage modules may be deformed by the housing which ensures a thorough mounting of the energy storage modules in the housing. Furthermore, if the flanges are present on the energy storage enclosure, a reduced thermal contact between the housing and the battery cells is obtained.

Further effects and features of this third aspect of the present disclosure are largely analogous to those described above in connection with the first and the second aspects of the disclosure.

Further features of, and advantages with, the present disclosure will become apparent when studying the appended claims and the following description. The skilled person realizes that different features of the present disclosure may be combined to create embodiments other than those described in the following, without departing from the scope of the present disclosure.

BRIEF DESCRIPTION OF THE DRAWINGS

These and other aspects of the present disclosure will now be described in more detail, with reference to the attached drawings.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In the following description, the present disclosure is mainly described with reference to an energy storage enclosure for an energy storage arranged in an electric vehicle in the form of a car. However, the disclosure may be applied to any type of electric vehicle such as a truck, a fork lift, a boat, etc.

Figure 1:
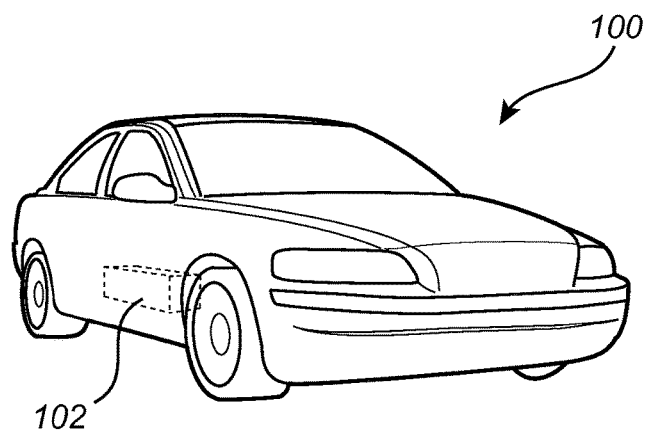
FIG. 1 schematically shows an exemplary application for an exemplary embodiment of an energy storage enclosure.

FIG. 1 illustrates an electric vehicle 100 comprising an energy storage 102. The energy storage 102 is configured to provide power for operating the electric vehicle 100. The electric vehicle 100 is depicted as an electric car, however any other vehicle, such as e.g., a truck is suitable. The energy storage 102 of this electric vehicle comprises an energy storage enclosure according to an exemplary embodiment of the present disclosure.

Figure 2:
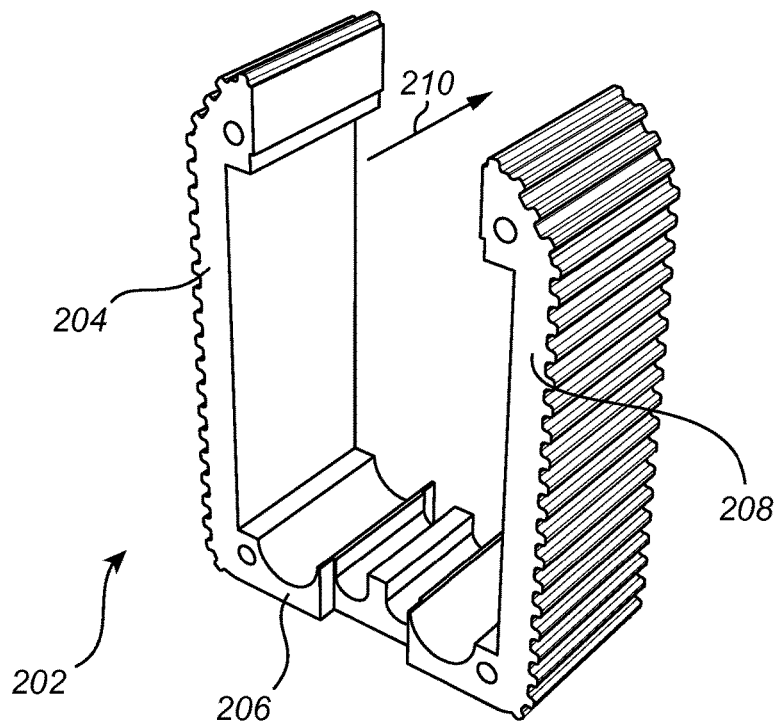
FIG. 2 shows an exemplary energy storage enclosure according to an embodiment of the present disclosure.

FIG. 2 shows an energy storage enclosure 202 according to an exemplary embodiment of the disclosure. The energy storage enclosure 202 is made from a foam material which has resilient properties. By the provision of a resilient material, the energy storage enclosure 202 is deformable but also the energy storage enclosure limits the deformation by attempting to spring back opposite an applied force. The energy storage enclosure comprises three wall members 204, 206, 208 which together form a U-shape. Furthermore, the U-shaped energy storage enclosure 202 has an extension in a direction corresponding to a longitudinal direction 210. In FIG. 2, the depicted energy storage enclosure 202 is made in one piece for example via a molding process.

Figure 3:
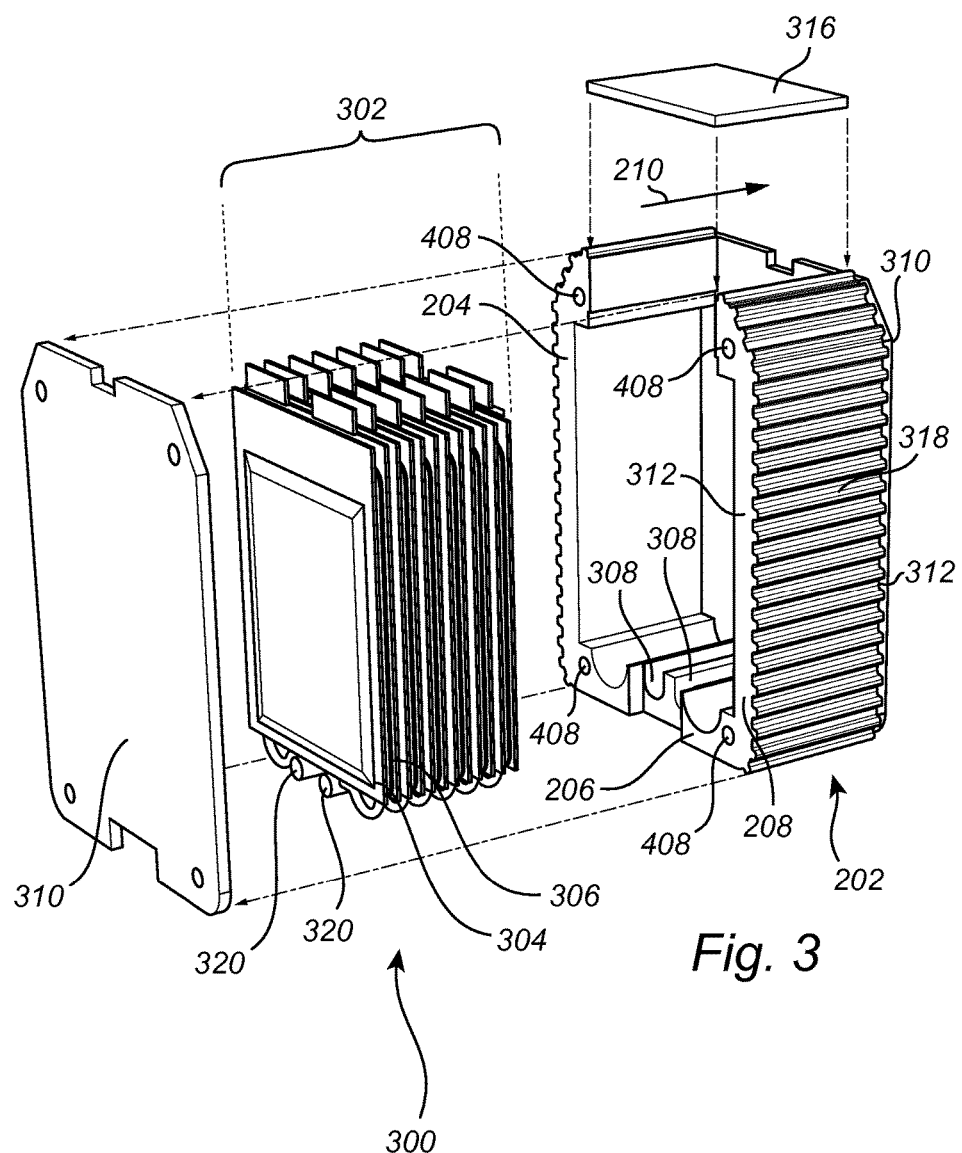
FIG. 3 shows an exemplary energy storage module according to an embodiment of the present disclosure.

FIG. 3 shows an energy storage module 300 comprising the energy storage enclosure 202 described with reference to FIG. 2. The U-shaped energy storage enclosure 202 is configured to accommodate a storage unit 302 comprising a plurality of energy storage cells 304 (only one is numbered in order to avoid cluttering in the drawing) arranged adjacent to and stacked with corresponding cooling plates 306 (only one is numbered in order to avoid cluttering in the drawing). Thereby, the energy storage cells 304 and the cooling plates 306 are stacked in the longitudinal direction 210 of the energy storage enclosure 202. Furthermore, there may be conduits 320 for providing a coolant such as a liquid to the cooling plates 306. The conduits 320 are arranged in grooves 308 formed in the energy storage enclosure 202. Thereby, heat generated by the energy storage cell 304 may be transported away from the energy storage cell 304 by the coolant. In order to obtain sufficient cooling performance by the cooling plate 306, a sufficient thermal contact between the cooling plate 306 and the energy storage cell 304 is required. The thermal contact is influenced by the contact pressure between the cooling plate 306 and the energy storage cell 304. Therefore, the energy storage enclosure 202 and the storage unit 302 may be compressed by compressing means configured to apply a force in the longitudinal direction 210. The resilient energy storage enclosure 202 is compressed by the force such that the contact pressure between the cooling plate 306 and the energy storage cell 304 increases, but the resilient property of the energy storage enclosure 202 also limits the contact pressure. Thereby, improved cooling of the energy storage cell 304 may be obtained by compressing the energy storage enclosure 202 and the storage unit 302 in the longitudinal direction 210 such that the thermal contact between the cooling plate 306 and the energy storage cell 304 is improved. When compressed, each energy storage module 300 (thus, the energy storage enclosure) may be compressed for example 1-4 mm. Furthermore, sides plates 310 are arranged to seal the energy storage enclosure 202 in the longitudinal direction 210. The side plates 310 advantageously enable a modular structure, as is more clearly seen in FIG. 4. For example, a simple replacement of a single energy storage module 300 in a stack of energy storage modules 300 is made possible. The side plates 310 may be attached to the energy storage enclosure 202 at end portions 312 of the energy storage enclosure 202 using e.g., glue, ultrasonic welding, staples, vibration welding, etc. A typical thickness of the side plates 310 is between 1 and 4 mm. The side plates 310 may be made from e.g., Acrylonitrile butadiene styrene (ABS). Also shown in FIG. 3 is a lid 316 for closing the energy storage enclosure. As shown in FIG. 3, the lid 316, is part of the energy storage module 300. In some exemplary embodiments, the lid 316 comprises connections for electrically connecting to the battery cells 304.

Furthermore, in the embodiment shown in FIG. 3, flanges 318 are arranged on an outer surface of the energy storage enclosure 202. The thermal contact between the energy storage enclosure 202 and an external housing is limited by the flanges 318, thus providing improved thermal isolation for the energy storage cells 304 and the cooling plates 306.

Figure 4:
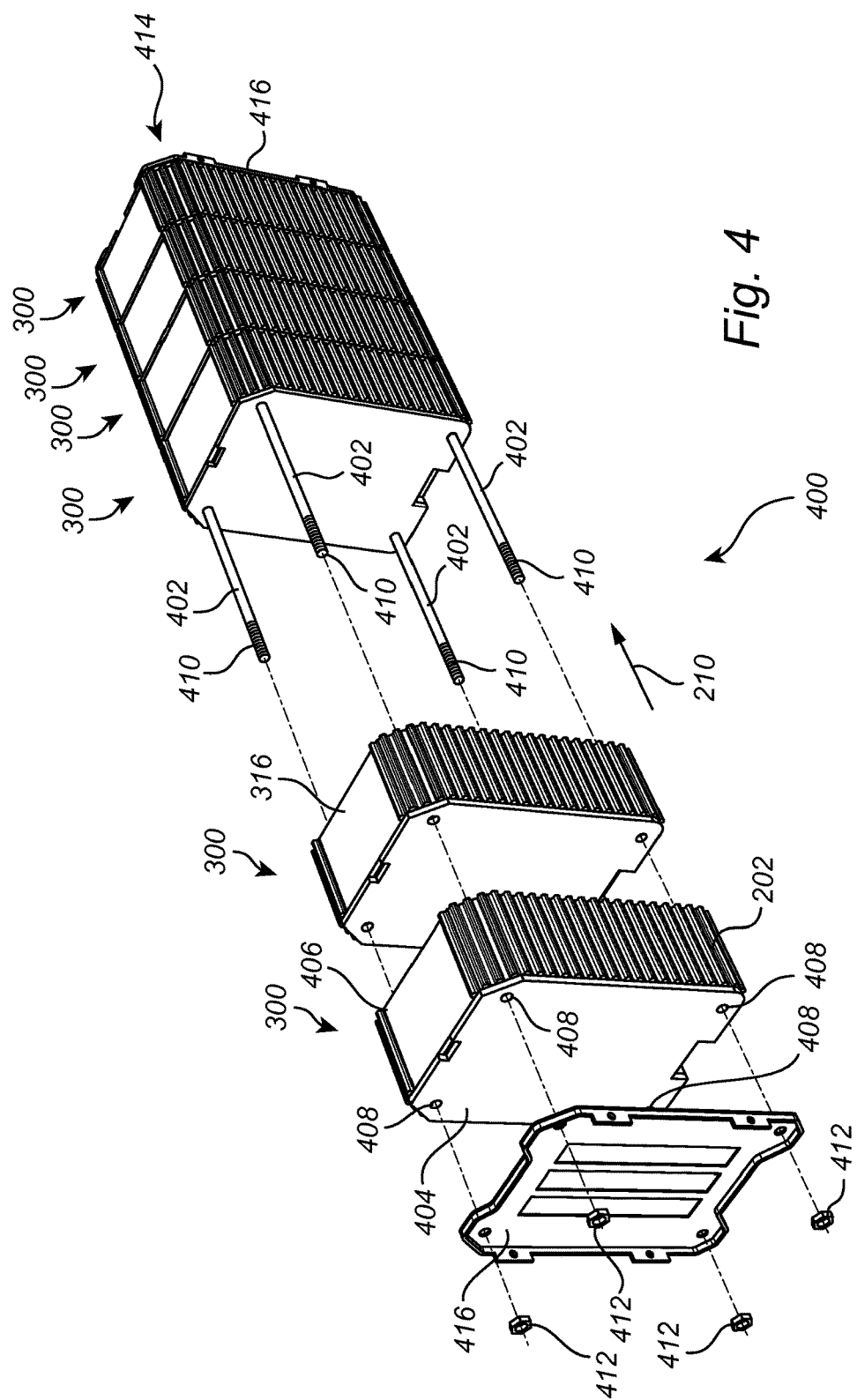
FIG. 4 shows an exemplary embodiment of the present disclosure.

FIG. 4 shows an exemplary embodiment of the disclosure. In FIG. 4, several energy storage modules 300 shown in FIG. 3 are arranged along the longitudinal direction 210 forming a battery pack 400. As shown in FIG. 4, compressing elements 402 are arranged to extend from a first end 404 to a second end 406 of each energy storage module 300 and thus also of each of the storage units arranged in the energy storage enclosures 202. In this exemplary embodiment, four pin-bolts 402 are arranged as compressing elements 402 each extending through a through-hole 408 of each of the energy storage enclosures 202 and the side plates 310. In addition, the pin-bolts 402 each have at least one threaded end 410 such that a nut 412 may screw onto the pin-bolt 402. The pin-bolts 402 may further have a stop element on one the end 414 opposite the threaded end 410. The stop element prevents the pin-bolt 402 from falling out from the through-hole 408. Furthermore, the stop element secures the pin-bolt such that the nut 412 may compress the storage unit 302 and the energy storage enclosure 202 when the nut 412 is tightened to the threaded end 410 of the pin-bolt 402. The stop element may for example be a nut. Furthermore, end plates 416 are arranged at each side of the stack of energy storage modules 300. The end plates 416 are arranged to apply a force on the energy storage enclosures 202 as a result of tightening the nuts 412 on the pin bolts 402. Note that, although the end plates 416 here are depicted as solid plates, they may have through-holes or also be configured as bars or similar as long as they are able to apply the force. A plate-like end plate 416 is advantageous because the applied force may be more evenly distributed on the energy storage enclosures 202. The amount of compression on the energy storage modules 300 may be controlled by for example monitoring the torque applied on the nut 412 or via ultrasonic measurements on the pin-bolt 410 end.

With the battery pack 400, the number of energy storage modules 300 may be adapted such that a desired total power output of the battery pack 400 is reached. For example, if the power from one energy storage module is 1.2 kWh (typical power is 1.0-1.5 kWh) eight modules 300 results in a total power of approximately 10 kWh (normal for a hybrid vehicle), or twenty-four modules 300 results in a total power of approximately 30 kWh (normal for an electric vehicle). Naturally, the length of the pin-bolts 410 is adapted to an appropriate length depending on the number of energy storage modules 300 in the battery pack 400. Note also that the size of each energy storage module may be the same.

Moreover, the lid 316 is part of the energy storage module 300 meaning that only one size of the lid 316 is needed for a complete battery pack 400.

In each of the above described exemplary embodiments in FIGS. 2-4, the energy storage enclosure may be made from a foam material such as for example expanded polypropylene (EPP).

Additionally, variations to the disclosed embodiments can be understood and effected by the skilled person in practicing the claimed disclosure, from a study of the drawings, the disclosure, and the appended claims. For example, the means for compressing the energy storage enclosure may be realized in ways other than what is shown in the drawings. For example, the means for compressing may comprise straps reaching across the energy storage enclosure in the longitudinal direction. The straps may be e.g., steel, nylon, fabric, or leather straps. Other means may be e.g., strings, ropes, or lashing straps.

In the claims, the word "comprising" does not exclude other elements or steps, and the indefinite article "a" or "an" does not exclude a plurality. The mere fact that certain features are recited in mutually different dependent claims does not indicate that a combination of these features cannot be used to advantage.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An energy storage module comprising:
   an energy storage enclosure made from a foam material and including three wall members that form a U-shape, each wall member extending in a longitudinal direction;
   first and second side plates positioned at opposite ends of the energy storage enclosure, wherein the side plates are not made of a foam material;
   a storage unit arranged in the energy storage enclosure such that the storage unit is in contact with the energy storage enclosure, the storage unit comprising an energy storage cell arranged adjacent to and stacked with a cooling plate in the longitudinal direction, the cooling plate being in thermal contact with the energy storage cell and comprising channels running through the cooling plate for providing cooling to the energy storage cell; and
   means for compressing the energy storage enclosure arranged to apply a force on the energy storage enclosure and the storage unit in the longitudinal direction, wherein the means for compressing is cooperable with the side plates to apply the force;
   wherein the energy storage enclosure is resilient in the longitudinal direction, such that when a force is applied in the longitudinal direction on the energy storage enclosure and the storage unit by the means for compressing, the energy storage enclosure is compressed, and a contact pressure between the cooling plate and the energy storage cell is limited by the energy storage enclosure, and wherein, when the side plates are not positioned at the opposite ends of the energy storage enclosure, the opposite ends of the energy storage enclosure are open.

2. The energy storage module according to claim 1 wherein the side plates are arranged to seal the energy storage enclosure in the longitudinal direction, the side plates being in contact with the wall members.

3. The energy storage module according to claim 1 wherein the storage unit comprises an additional energy storage cell stacked with the cooling plate such that the cooling plate is in thermal contact with the additional energy storage cell.

4. A battery pack comprising a plurality of energy storage modules according to claim 1.

5. The battery pack according to claim 4 wherein the energy storage modules are stacked in the longitudinal direction, and the means for compressing is arranged to apply the force on the battery pack in the longitudinal direction causing a compression of each energy storage enclosure of the battery pack.

6. The battery pack according to claim 5 further comprising a housing arranged to accommodate the energy storage modules.

7. The energy storage module according to claim 1 wherein the means for compressing comprises a compressing element arranged to extend from a first end of the storage unit to a second end of the storage unit in the longitudinal direction.

8. The energy storage module according to claim 7 wherein the energy storage enclosure has a through-hole that extends through an entire length of one of the wall members, and wherein the compressing element is a pin-bolt configured to extend through the through-hole.

9. The energy storage module according to claim 1 wherein the side plates are arranged to apply the force on the wall members.

10. The energy storage module according to claim 1 wherein the foam material is expanded polypropylene (EPP).

11. The energy storage module according to claim 1 wherein at least one of the wall members comprises flanges arranged on an outer surface, and wherein the flanges extend in the longitudinal direction from one end of the at least one wall member to an opposite end of the at least one wall member.

12. The energy storage module according to claim 1 wherein the energy storage enclosure is a one piece structure.

13. The energy storage module according to claim 1 further comprising a transfer conduit to transfer a coolant to the cooling plate, wherein one of the wall members of the energy storage enclosure comprises a groove formed in an inner side of the wall member that receives the transfer conduit.

14. The energy storage module according to claim 1 wherein the energy storage enclosure provides thermal isolation for the energy storage cell.

15. The energy storage module according to claim 1 wherein the channels are configured to receive a liquid coolant.

16. The energy storage module according to claim 1 wherein the channels are configured to receive air.

17. An energy storage module comprising:
  a U-shaped energy storage enclosure made from a foam material and including three wall members forming the U-shape, each wall member extending in a longitudinal direction;
  first and second side plates at opposite ends of the energy storage enclosure, wherein the side plates are not made of a foam material;
  a storage unit arranged in the energy storage enclosure such that the storage unit is in contact with the energy storage enclosure, the storage unit comprising an energy storage cell arranged adjacent to and stacked with a cooling plate in the longitudinal direction, the cooling plate being in thermal contact with the energy storage cell and having a channel for providing cooling to the energy storage cell; and
  a compressing element configured to apply a force on the three wall members and the storage unit in the longitudinal direction, wherein the compressing element is cooperable with the side plates to apply the force;
  wherein the three wall members are resilient in the longitudinal direction, such that when a force is applied in the longitudinal direction on the three wall members and the storage unit by the compressing element, the three wall members are compressible, and a contact pressure between the cooling plate and the energy storage cell is limited by the three wall members.

18. The energy storage module according to claim 17 wherein the energy storage enclosure provides thermal isolation for the energy storage cell.

19. The energy storage module according to claim 17 wherein the channel is configured to receive a liquid coolant.

* * * * *